United States Patent
Sanada et al.

(10) Patent No.: US 9,163,731 B2
(45) Date of Patent: *Oct. 20, 2015

(54) LIP TYPE SEAL (75) Inventors: Masamitsu Sanada, Tokyo (JP); Masatoshi Itadani, Tokyo (JP)

(73) Assignee: Eagle Industry Co., Ltd. (JP)

( * ) Notice: Subject to any disclaimer, the term of this patent is extended or adjusted under 35 U.S.C. 154(b) by 482 days.

This patent is subject to a terminal disclaimer.

(21) Appl. No.: 12/678,700

(22) PCT Filed: Apr. 6, 2009

(86) PCT No.: PCT/JP2009/057046
§ 371 (c)(1),
(2), (4) Date: Mar. 17, 2010

(87) PCT Pub. No.: WO2009/139235
PCT Pub. Date: Nov. 19, 2009

(65) Prior Publication Data
US 2010/0244389 A1 Sep. 30, 2010

(30) Foreign Application Priority Data

May 15, 2008 (JP) .................................. 2008-127861
Jul. 2, 2008 (JP) .................................. 2008-172877

(51) Int. Cl.
F16J 15/32 (2006.01)
(52) U.S. Cl.
CPC .................................. *F16J 15/3228* (2013.01)
(58) Field of Classification Search
USPC .......................... 277/551, 572, 573, 576, 577
See application file for complete search history.

(56) References Cited

U.S. PATENT DOCUMENTS

| 2,867,457 | A | * | 1/1959 | Riesing et al. | 277/562 |
|---|---|---|---|---|---|
| 3,254,898 | A | * | 6/1966 | Herbenar et al. | 277/558 |
| 3,276,783 | A | | 10/1966 | McKinven | |
| 3,338,584 | A | | 8/1967 | Nakanishi et al. | |
| 3,494,682 | A | | 2/1970 | Keller | |
| 3,612,547 | A | * | 10/1971 | Kan | 277/563 |
| 3,741,615 | A | | 6/1973 | Otto | |
| 4,470,605 | A | | 9/1984 | Deuring | |
| 4,623,153 | A | * | 11/1986 | Nagasawa | 277/551 |

(Continued)

FOREIGN PATENT DOCUMENTS

| CN | 1877169 A | 12/2006 |
|---|---|---|
| DE | 38 26 629 A1 | 2/1990 |

(Continued)

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

To facilitate recycling and prevent rotation of constituent parts, a lip type seal has a first lip seal member constructed from a rubber-like elastic material, a metal-made retaining ring held at the first lip seal member without bonding, and a resin-made second lip seal member and a backup ring which are held at the retaining ring by caulking. The first lip seal member has a tubular portion, a radial portion, a seal lip, and a collar portion. The retaining ring has a cylinder portion, a first flange portion, and a second flange portion, and the second lip seal member and the backup ring are held between the first and second flange portions by caulking. A convex portion is provided at a position in the circumferential direction of the first flange portion, and the convex portion engages with the second lip seal member to prevent rotation of the second lip seal member.

2 Claims, 4 Drawing Sheets

(56) References Cited

U.S. PATENT DOCUMENTS

| | | | |
|---|---|---|---|
| 4,696,479 A | 9/1987 | Karcher | |
| 4,848,776 A | 7/1989 | Winckler | |
| 5,056,799 A * | 10/1991 | Takenaka et al. | 277/562 |
| 5,582,412 A | 12/1996 | Sabo Filho | |
| 5,845,910 A | 12/1998 | Sabo | |
| 5,860,656 A * | 1/1999 | Obata et al. | 277/559 |
| 5,957,461 A * | 9/1999 | Ulrich | 277/569 |
| 6,290,470 B1 * | 9/2001 | Okuno et al. | 417/269 |
| 6,367,810 B1 * | 4/2002 | Hatch | 277/551 |
| 6,367,811 B1 * | 4/2002 | Hosokawa et al. | 277/560 |
| 6,457,723 B1 * | 10/2002 | Yamada et al. | 277/572 |
| 6,543,786 B2 * | 4/2003 | Osumi et al. | 277/549 |
| 6,565,096 B2 * | 5/2003 | Ikeda et al. | 277/551 |
| 6,840,521 B2 * | 1/2005 | Ikeda | 277/551 |
| 7,344,140 B2 * | 3/2008 | Ikeda | 277/572 |
| 7,347,424 B2 * | 3/2008 | Madigan | 277/551 |
| 7,467,797 B2 * | 12/2008 | Oiyama et al. | 277/553 |
| 7,942,424 B2 * | 5/2011 | Shimomura et al. | 277/551 |
| 7,959,158 B2 * | 6/2011 | Sanada | 277/551 |
| 8,011,671 B2 * | 9/2011 | Madigan | 277/551 |
| 8,011,672 B2 * | 9/2011 | Shimomura et al. | 277/551 |
| 2002/0017760 A1 | 2/2002 | Pataille et al. | |
| 2002/0182072 A1 | 12/2002 | Kato et al. | |
| 2003/0138332 A1 * | 7/2003 | Osako et al. | 417/269 |
| 2004/0239041 A1 * | 12/2004 | Morimoto et al. | 277/549 |

FOREIGN PATENT DOCUMENTS

| | | |
|---|---|---|
| DE | 10224175 A1 | 4/2003 |
| EP | 0 116 721 | 8/1984 |
| EP | 1 156 241 | 11/2001 |
| EP | 1598579 A1 | 11/2005 |
| JP | 59-137664 | 8/1984 |
| JP | 63-043873 | 3/1988 |
| JP | 01-182673 A | 7/1989 |
| JP | 3137481 A | 6/1991 |
| JP | 08-075008 | 3/1996 |
| JP | 09-112704 | 5/1997 |
| JP | 10-318377 A | 12/1998 |
| JP | 11-351385 | 12/1999 |
| JP | 2001-280510 | 10/2001 |
| JP | 2002-013643 | 1/2002 |
| JP | 2002-364759 A | 12/2002 |
| JP | 2002-364761 A | 12/2002 |
| JP | 2003-042304 | 2/2003 |
| JP | H05-014739 U | 11/2007 |
| WO | WO-2004/076894 A1 | 9/2004 |
| WO | 2004-094877 | 11/2004 |

* cited by examiner

// LIP TYPE SEAL

CROSS-REFERENCE TO RELATED APPLICATIONS

This is a national stage of the International Application No. PCT/JP2009/057046 filed on Apr. 6, 2009 and published in the Japanese language. This application claims the benefit of Japanese Application No. 2008-127861, filed May 15, 2008 and Japanese Application No. 2008-172877, filed Jul. 2, 2008. The disclosures of the above applications are incorporated herein by reference.

BACKGROUND OF THE INVENTION

1. Field of the Invention

The present invention relates to a lip type seal corresponding to one kind of a sealing apparatus. The lip type seal in accordance with the present invention is used, for example, as a water pump seal for a vehicle such as a motor vehicle or the like, or is used as the other general purpose water pump seal.

2. Description of the Conventional Art

Figure 4:
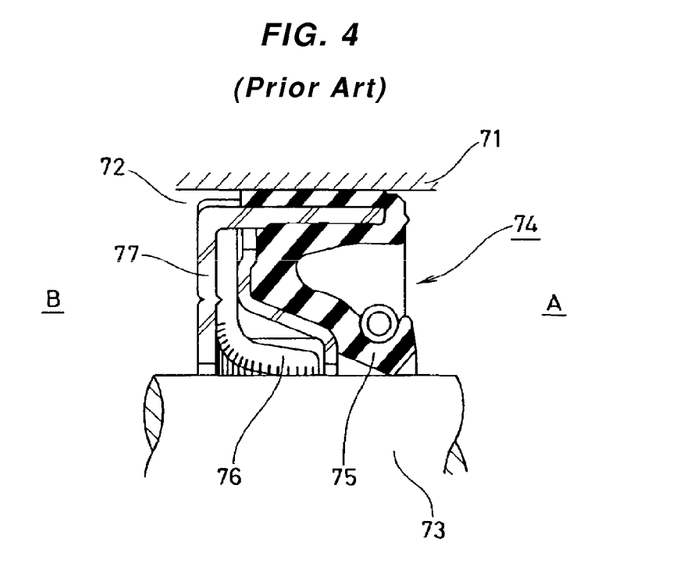
FIG. 4 is a half sectional view of a lip seal in accordance with a conventional art.

Conventionally, as shown in FIG. 4, there has been known a lip type seal 74 which is installed to an inner periphery of a shaft hole 72 of a housing 71 and slidably comes into close contact with a peripheral surface of a shaft 73 inserted to the shaft hole 72, and the lip type seal 74 has a first seal lip 75 which is arranged at a sealed fluid side A and is made of a rubber-like elastic material, and a second seal lip 76 which is arranged at an atmospheric air side B and made of a resin (refer to patent document 1).

Since the conventional lip type seal 74 mentioned above has a plurality of seal lips 75 and 76 each of which performs a seal operation, an excellent seal effect can be achieved, however, causes a disadvantage in the following point.

In particular, on the basis of necessity for recycle against an environmental problem in recent years, it is required to dispose of each of constructing parts of the lip type seal after being sorted by material, however, in the lip type seal 74 mentioned above, the first seal lip 75 made of the rubber-like elastic material is vulcanization bonded to a reinforcing ring 77 made of a metal, and both the elements 75 and 77 are formed as an integral vulcanization molded product. Accordingly, it is impossible to easily separate and sort both the elements 75 and 77 at a time of disposal, and it is therefore impossible to comply with the necessity for recycle mentioned above.

Figure 5:
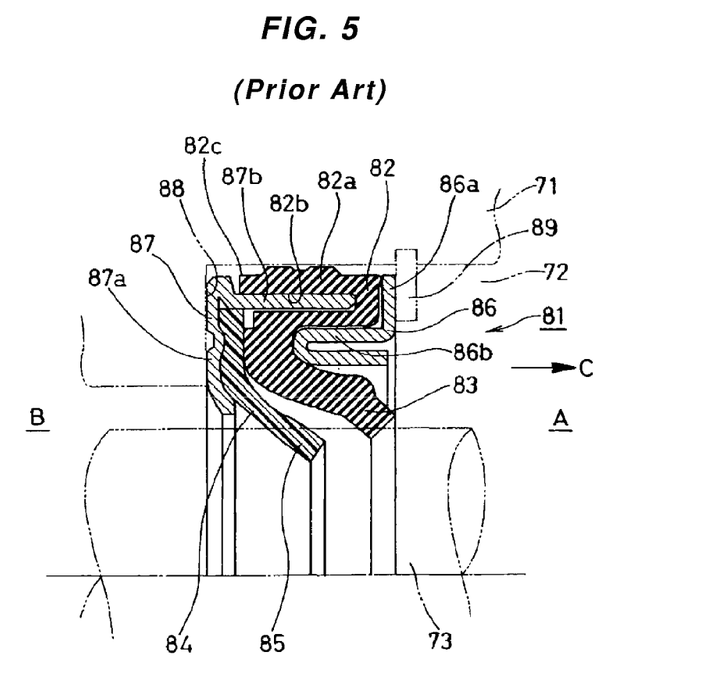
FIG. 5 is a half sectional view of a lip seal in accordance with another conventional art.

Accordingly, the applicant of the present invention has proposed a lip type seal 81 having a first lip seal member 82 provided with a first seal lip 83 arranged at a sealed fluid side A and made of a rubber-like elastic material, a second lip seal member 84 provided with a second seal lip 85 arranged at an atmospheric air side B and made of a resin, and two retaining rings 86 and 87 pinching both the lip seal members 82 and 84 from both sides in an axial direction and made of a metal, and having a structure in which these four parts are assembled without being bonded, as shown in FIG. 5 (refer to patent document 2). In accordance with this prior art, since each of the parts is not bonded, it is possible to easily separate and sort each of the parts. Accordingly, it is possible to comply with the necessity for recycle mentioned above. However, in the prior art, there is room of improvement in the following points.

(1) Assembly Retaining Characteristic Among Constructing Parts

In the lip type seal 81 mentioned above, two retaining rings 86 and 87 are respectively structured such as to have annular flat surface portions 86a and 87a for pinching both the lip seal members 82 and 84 from both sides in an axial direction and tubular portions 86b and 87b integrally formed with the flat surface portions 86a and 87a. The tubular portion 86b in the retaining ring 86 at the sealed fluid side A is fitted to an inner peripheral side of a cylinder portion 82a of the first lip seal member 82 and the tubular portion 87b in the retaining ring 87 at the atmospheric air side B is pressure inserted and fixed to an insertion hole 82b provided in the cylinder portion 82a of the first lip seal member 82. Accordingly, each of the parts is retained in an assembled state on the basis of setting of a fitting margin and a pressure inserting margin for the fitting and pressure insertion. However, in the case that each of the parts is exposed to force in the axial direction, an engagement structure for preventing separation in an axial direction of the parts is not particularly provided among the parts. Therefore, if the retaining ring 86 at the sealed fluid side A is pulled in an axial direction (a direction of an arrow C) so as to detach the lip type seal 81 in a state of being installed to an inner periphery of the shaft hole 72 of the housing 71, there is a case that only this retaining ring 86 is pulled out and the other parts remain in an installed state (alternatively, there may be a case that only the retaining ring 86 and the first lip seal member 82 are pulled out, and the second lip seal member 84 and the retaining ring 87 at the atmospheric air side B remain). This is because of nothing but the assembly retaining force among the parts depending only upon friction force.

(2) Installing Workability

Further, in the lip type seal 81 mentioned above, two retaining rings 86 and 87 do not particularly have any structure for defining an interval in an axial direction therebetween. Further, the first lip seal member 82 made of the rubber-like elastic material and pinched between both the elements can achieve a sufficient seal operation only when used in a state of being compressed in the axial direction. In other words, there is a risk that a leak of sealed fluid is caused between the first lip seal member 82 and the second lip seal member 84 made of the resin or the retaining ring 87 at the atmospheric air side B. Accordingly, at a time of installing the lip type seal 81 mentioned above, the lip type seal 81 is installed by using a snap ring 89 while the lip type seal 81 is brought into contact with a step portion 88 provided on an inner periphery of the shaft hole 72 of the housing 71 so as to apply a compression load in the axial direction, whereby the lip type seal 81 is installed in a state that the whole thereof is compressed in the axial direction between the step portion 88 and the snap ring 89. However, there is such a disadvantage that a work of installing by using the snap ring 89 while applying the compression load in the axial direction as mentioned above is extremely complicated.

Further, since the cylinder portion 82a of the first lip seal member 82 is provided with the annular insertion hole 82b which is open to the atmospheric air side B, a portion at an outer peripheral side from the insertion hole 82b in the cylinder portion 82a is formed to have such a shape that the atmospheric air side end portion 82c thereof terminates in a cylindrical shape. Accordingly, since the atmospheric air side end portion 82c rubs the inner peripheral surface of the shaft hole 72 at a time of the first lip seal member 82 being inserted into the inner periphery of the shaft hold 72 of the housing 71, there is a case that an evagination is caused in the atmospheric air side end portion 82c.

PRIOR ART PUBLICATION

Patent Publication

Reference is made to Japanese Unexamined Patent Publication No. 10-318377 and International Application No. WO2004/076894A1.

Further, in a bonded type lip seal in which the seal lip 75 made of a rubber-like elastic material is vulcanization bonded to the reinforcing ring 77 made of a metal as shown in FIG. 4, there is pointed out a problem of a foaming resistance. In particular, together with a tendency toward a high speed and a high temperature of an engine in recent years, a cooling water of the water pump for cooling the engine tends to become a high temperature and a high pressure, and a seal portion ambient atmosphere becomes severe. In the bonded type lip seal under the use condition mentioned above, since the seal lip 75 made of the rubber-like elastic material and the reinforcing ring 77 made of the metal are bonded, there is a case that a foaming phenomenon is generated in the seal lip 75 in the case of being used under a high load condition, thereby lowering a sealing performance.

SUMMARY OF THE INVENTION

Problem to be Solved by the Invention

The present invention is made by taking the points mentioned above into consideration, and an object of the present invention is to provide a lip type seal in which constructing parts of the lip type seal can be easily separated and sorted per material, whereby it is possible to comply with necessity for recycle, an assembly retaining characteristic among the constructing parts is good, and an installing workability is good as well. In addition, an object of the present invention is to provide a lip type seal in which a sealing performance can be stabilized with a good foaming resistance. Further, in addition, an object of the present invention is to provide a lip type seal in which the constructing parts of the lip type seal can be prevented from being relatively displaced in a circumferential direction, whereby it is possible to stabilize the sealing performance also in this regard.

Means for Solving the Problem

In order to achieve the object mentioned above, in accordance with claim 1 of the present invention, there is provided a lip type seal installed to an inner periphery of a shaft hole of a housing to slidably come into close contact with a peripheral surface of a shaft, the lip type seal comprising:

a first lip seal member made of a rubber-like elastic material and fitted to the inner periphery of the shaft hole;

a retaining ring made of a metal and fitted and retained to the first lip seal member in a non-bonding manner;

a second lip seal member made of a resin and retained by caulking to the retaining ring; and a backup ring supporting the second lip seal member, wherein the first lip seal member integrally has a tubular portion fitted to the inner periphery of the shaft hole, a radial portion provided on one end portion in an axial direction of the tubular portion, a seal lip provided on an inner peripheral end portion of the radial portion, and a collar portion provided on the other end portion in the axial direction of the tubular portion, wherein the retaining ring integrally has a cylinder portion fitted in a non-bonding manner between the radial portion and the collar portion at an inner peripheral side of the tubular portion of the first lip seal member, a first flange portion provided on one end portion in an axial direction of the cylinder portion in such a manner as to come into contact with the radial portion, and a second flange portion provided on the other end portion in the axial direction of the cylinder portion in such a manner as to come into contact with the collar portion, and wherein the second lip seal member and the backup ring are retained by caulking between the both flange portions.

Further, in accordance with the second aspect of the present invention, there is provided a lip type seal as recited in the first aspect, wherein a convex portion of a part on a circumference is provided in the other end surface in the axial direction of the first flange portion in the retaining ring, and the convex portion is engaged with the second lip seal member made of the resin, whereby the retaining ring and the second lip seal member are prevented from rotating.

Further, in accordance with the third aspect of the present invention, there is provided a lip type seal as recited in the second aspect, wherein a concave portion of a part on the circumference corresponding to the convex portion is provided in the one end surface in the axial direction of the first flange portion by the convex portion is formed in accordance with a press work, and the first lip seal member made of the rubber-like elastic material being engaged with the concave portion, whereby the retaining ring and the first lip seal member are prevented from rotating.

Further, in accordance with the fourth aspect of the present invention, there is provided a lip type seal as recited in the first, second or third aspects, wherein the lip type seal is fitted to and retained in a cartridge, and is installed to a housing via the cartridge.

The lip type seal in accordance with the present invention having the structure mentioned above is installed to the inner periphery of the shaft hole of the housing to slidably come into close contact with the peripheral surface of the shaft, thereby sealing between the housing and the shaft, and has four parts including the first lip seal member made of the rubber-like elastic material, the retaining ring made of the metal, the second lip seal member made of the resin, and the backup ring as the constructing parts, the retaining ring among them is fitted and retained in an non-bonding manner to the first lip seal member, and the second lip seal member and the backup ring are retained by caulking to the retaining ring. Accordingly, since the four parts are assembled in the non-bonding manner without being bonded to each other, it is possible to easily separate and sort each of the parts at a time of dissembling the seal.

Further, since the second lip seal member and the backup ring are retained by caulking to the retaining ring, these three parts can be firmly assembled with each other even in the non-bonding manner, and are not relatively displaced in the axial direction. Since the retaining ring is fitted between the radial portion and the collar portion at the inner peripheral side of the tubular portion of the first lip seal member, the first flange portion of the retaining ring is arranged in such a manner as to come into contact with the radial portion of the first lip seal member, and the second flange portion of the retaining ring is arranged in such a manner as to come into contact with the collar portion of the first lip seal member, these two parts can be firmly assembled with each other even in the non-bonding manner, and are not relatively displaced in the axial direction. Accordingly, since all of the four parts are firmly assembled in conjunction with each other, it is possible to increase the assembly retaining force among the parts.

Further, the four parts have been already integrated with each other by caulking and fitting at a time of installing the lip type seal to the housing, and the assembly has been finished in a ready-to-use state. Accordingly, it is possible to omit a regulating step or the like for maintaining an assembly length precision in the axial direction which is required in an installing step of the conventional non-bonding type lip seal.

Further, since the collar portion is provided on the other end portion in the axial direction of the tubular portion in the first lip seal member, the end portion is thickened and is structured such as to be hardly deformed. Accordingly, an evagination phenomenon is not generated at the other end portion in the axial direction of the tubular portion at a time of inserting the lip type seal to the inner periphery of the shaft hole of the housing.

Further, since the retaining ring is fitted and retained in the non-bonding manner to the first lip seal member, the lip type seal does not have the structure in which the rubber-like elastic material (the first lip seal member) is vulcanized and bonded to the metal (the retaining ring). Accordingly, even if the lip type seal is used under a high load condition, a foaming phenomenon which is peculiar to the bonding structure is not generated in the rubber-like elastic material.

Further, the increase of the assembly retaining force among the parts as mentioned above is provided mainly for preventing the parts from being relatively displaced in the axial direction, however, there is a case that a countermeasure is required for preventing the parts from being relatively displaced in the circumferential direction. As mentioned above, since the second lip seal member and the backup ring are retained by caulking to the retaining ring, and the retaining ring is fitted between the radial portion and the collar portion at the inner peripheral side of the tubular portion of the first lip seal member, each of the parts is prevented from rotating to a certain extent on the basis of caulking force and a fitting margin, however, there is a case that a further countermeasure for preventing the rotation is required. Then, in the case mentioned above, the convex portion of a part on the circumference is provided in the other end surface in the axial direction of the first flange portion in the retaining ring, and the retaining ring and the second lip seal member are prevented from rotating by engaging the convex portion with the second lip seal member made of the resin (second aspect). Further, in the case that the convex portion is formed by the press work, since the concave portion of a part on the circumference corresponding to the convex portion is provided in the back surface of the first flange portion (the one end surface in the axial direction), the retaining ring and the first lip seal member are prevented from rotating by utilizing the concave portion and engaging the first lip seal member made of the rubber-like elastic material with the concave portion (third aspect). In accordance with these structures, it is possible to effectively prevent the parts from relatively rotating only by providing the convex portion or the concave portion of a part on the circumference in the retaining ring.

In this case, the lip type seal is directly installed to the housing, however, may be structured such as to be fitted to and retained in the cartridge and be installed to the housing via the cartridge in place of direct installation.

Effect of the Invention

The present invention achieves the following effects.

In the present invention, since the lip type seal has the four parts including the first lip seal member made of the rubber-like elastic material, the retaining ring made of the metal, the second lip seal member made of the resin, and the backup ring, as mentioned above, the retaining ring is fitted and retained in the non-bonding manner to the first lip seal member, the second lip seal member and the backup ring are retained by caulking to the retaining ring, it is possible to easily separate and sort each of the parts at a time of disassembling the seal. Accordingly, it is possible to comply with the necessity for recycle that the constructing parts of the lip type seal are disposed after being sorted by material.

Further, since the second lip seal member and the backup ring are retained by caulking to the retaining ring, these three parts can be firmly assembled even in the non-bonding manner. Since the retaining ring is fitted between the radial portion and the collar portion at the inner peripheral side of the tubular portion of the first lip seal member, these two parts can be firmly assembled even in the non-bonding manner. Accordingly, since all of the four parts can be firmly assembled, it is possible to increase the assembly retaining force among the parts. Therefore, it is possible to prevent a disadvantage that only some of the parts are pulled out at a time of detaching the lip type seal from the housing like as the prior art from being caused.

Further, since the four parts have been completely assembled already at a time when the lip type seal is installed to the housing, it is possible to omit the regulating step or the like for maintaining the assembly length precision in the axial direction which has been required in the installing step of the conventional non-bonding type lip seal.

Further, since the collar portion is integrally formed on the other end portion in the axial direction of the tubular portion in the first lip seal member, it is possible to prevent the evagination phenomenon from being generated in the other end portion in the axial direction of the tubular portion at a time when the lip type seal is inserted to the inner periphery of the shaft hole of the housing.

Further, since there is no structure in which the rubber-like elastic material (the first lip seal member) is vulcanized and bonded to the metal (the retaining ring), the foaming phenomenon is not generated in the rubber-like elastic material even if the lip type seal is used under the high load condition. Accordingly, it is possible to improve the foaming resistance of the lip type seal, and it is possible to stabilize the sealing performance.

Further, in the case that the retaining ring and the second lip seal member are prevented from rotating by providing the convex portion of a part on the circumference in the other end surface in the axial direction of the first flange portion in the retaining ring, and engaging the convex portion with the second lip seal member made of the resin, it is possible to effectively prevent the parts from relatively rotating on the basis of the structure in which the convex portion of a part on the circumference is only provided in the retaining ring. Accordingly, it is possible to prevent the second lip seal member made of the resin from rotating together by the sliding motion with the shaft, and it is possible to stabilize the sealing performance.

Further, in the case that the convex portion is formed by the press work, since the concave portion of a part on the circumference corresponding to the convex portion is provided in the back surface (the one end surface in the axial direction) of the first flange portion, the retaining ring and the first lip seal member are prevented from rotating by utilizing the concave portion and engaging the first lip seal member made of the rubber-like elastic material with the concave portion. In accordance with this structure, it is possible to prevent the assembly constructed by the second lip seal member made of the resin, the backup ring and the retaining ring from rotating together by the sliding motion with the shaft, and it is accordingly possible to stabilize the sealing performance.

DETAILED DESCRIPTION OF PREFERRED EMBODIMENT

The present invention includes the following modes.

(1) A metal ring (a retaining ring) is provided with a projection (a convex portion), and is provided with a mechanism for preventing a lip made of a resin from rotating together.

(2) In a lip type seal constructed by a liquid side lip and an atmospheric air side lip, a resin made lip at the atmospheric air side is caulked and fixed between a metal ring (a retaining ring) and an L ring (a backup ring), the resin made lip is fixed by a projection portion (a convex portion) installed in the metal ring, and the resin made lip which is fixed by the metal ring is fitted in the liquid side lip.

Embodiments

Next, a description will be given of embodiments in accordance with the present invention with reference to the accompanying drawings.

First Embodiment

Figure 1:
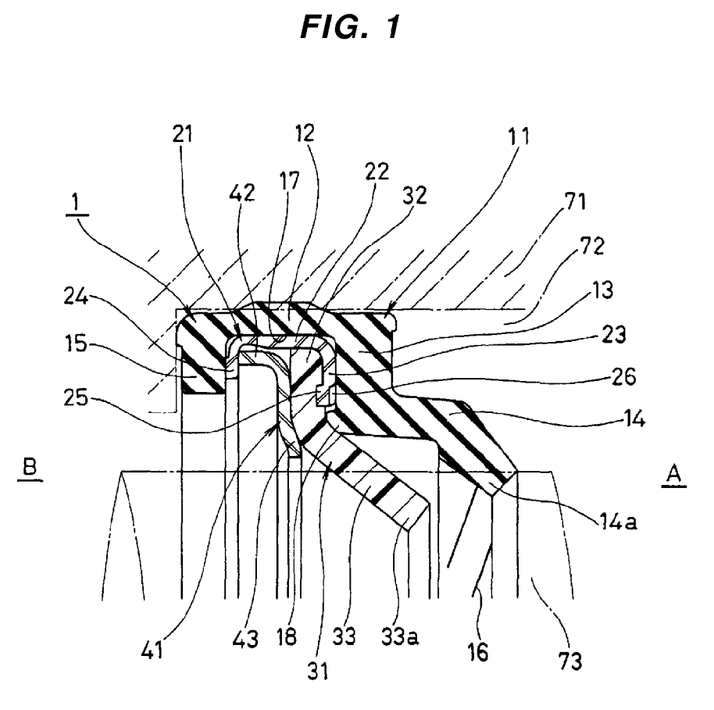
FIG. 1 is a sectional view of a substantial part of a lip type seal in accordance with a first embodiment of the present invention.

FIG. 1 shows a section of a substantial part of a lip type seal 1 in accordance with a first embodiment of the present invention, and the lip seal 1 is structured as follows. In this case, the lip seal 1 is used as a water pump seal for a motor vehicle for sealing a cooling water. The right side of the figure shows a cooling water side, that is, a sealed fluid side A, and the left side of the figure shows an atmospheric air side B.

The lip type seal 1 is structured such as to be installed to an inner periphery of a shaft hole (a bore) 72 of a housing (a pump housing) 71 so as to slidably come into close contact with a peripheral surface of a shaft (a rotating shaft) 73, and has a seal lip 14 made of a rubber-like elastic material and arranged at the sealed fluid side A, and a seal lip 33 made of a resin and arranged at the atmospheric air side B so as to form a two-stage lip construction.

Further, the lip type seal 1 has four parts including a first lip seal member 11 made of a rubber-like elastic material and fitted to an inner periphery of a shaft hole 72, a retaining ring (a case) 21 made of a metal and fitted and retained in a non-bonding manner to the first lip seal member 11, a second lip seal member 31 made of a resin and retained by caulking to the retaining ring 21, and a backup ring (a metal ring) 41 similarly retained by caulking to the retaining ring 21 and supporting the second lip seal member 31, as constructing parts thereof.

First of all, the first lip seal member 11 is constructed by a predetermined rubber-like elastic material (for example, H-NBR), has a tubular portion 12 fitted to an inner periphery of the shaft hole 72, and is structured such that a radial portion 13 is integrally formed from an end portion at the sealed fluid side of the tubular portion 12 (one end portion in an axial direction) toward an inner side in a radial direction, a seal lip (a first seal lip) 14 is integrally formed from an inner peripheral end portion of the radial portion 13 toward the sealed fluid side A, and a collar portion 15 is integrally formed from an end portion at the atmospheric air side of the tubular portion 12 (the other end portion in the axial direction) toward the inner side in the radial direction. The seal lip 14 is structured such as to slidably come into close contact with a peripheral surface of the shaft 73 by a lip end 14a thereof, and a sliding portion is provided with a thread portion (a thread seal) 16 performing a pumping action at a time when the shaft rotates.

The retaining ring 21 is constructed by a press worked product of a metal plate (for example, a stainless steel or a steel (SPCC, SPHC and the like)), has a cylinder portion 22 which is fitted in a non-bonding manner to an annular concave portion (a fitting concave portion) 17 between the radial portion 13 and the collar portion 15 at an inner peripheral side of the tubular portion 12 of the first lip seal member 11, and is structured such that a first flange portion 23 is integrally formed from an end portion at a sealed fluid side of the cylinder portion 22 toward an inner side in a radial direction, and a second flange portion 24 is integrally formed from an end portion at the atmospheric air side of the cylinder portion 22 toward the inner side in the radial direction. Accordingly, the retaining ring 21 is structured such as to be formed in a C-shape in section which is open toward an inner side in the radial direction as a whole so as to be pressure inserted to the annular concave portion 17, and when it is pressure inserted, the cylinder portion 22 comes into close contact with the tubular portion 12, the first flange portion 23 comes into close contact with the radial portion 13, and the second flange portion 24 comes into close contact with the collar portion 15, respectively. A convex portion 25 and a concave portion 26 are formed in the first flange portion 23 for preventing a rotation, however, a description will be given later of these elements.

The second lip seal member 31 is made of a predetermined resin material (for example, PTFE), has an annular flat surface portion 32, and is structured such that a seal lip (a second seal lip) 33 is integrally formed on an inner peripheral end portion of the flat surface portion 32 in such a manner that the seal lip is inclined to the sealed fluid side A. Since the seal lip 33 slidably comes into close contact with a peripheral surface of a shaft 73 by its lip end 33a, and is arranged at the atmospheric air side B of the first seal lip 14, it forms a secondary seal while the first seal lip 14 forms a primary seal.

The backup ring 41 is made of a press worked product of a metal plate (for example, a stainless steel or a steel (SPCC, SPHC or the like)) similarly to the retaining ring 21, has a cylinder portion 42, and is structured such that a flange portion 43 is integrally formed from an end portion at the sealed fluid side of the cylinder portion 42 toward an inner side in a radial direction. The backup ring 41 is arranged at the atmospheric air side B of the second lip seal member 31, and perform an operation of supporting the second lip seal member 31 from the atmospheric air side B.

The second lip seal member 31 and the backup ring 41 are fixed by caulking with the retaining ring 21 as mentioned above, and the flat surface portion 32 of the second lip seal member 31 and the cylinder portion 42 of the backup ring 41 are fixed by caulking between the first and second flange portions 23 and 24 at the inner peripheral side of the cylinder portion 22 of the retaining ring 21 so as to be arranged side by side in the axial direction. The caulking work is done by bending the second flange portion 24 having a comparatively thin bent portion. After caulking, the second lip seal member 31 comes into pressure contact with the first flange portion 23 by the flat surface portion 32.

Further, in the embodiment mentioned above, there is particularly provided with the rotation preventing structure for preventing the retaining ring 21 and the second lip seal member 31 from rotating, and the rotation preventing structure is constructed by the convex portion 25 provided in the first flange portion 23 of the retaining ring 21. In other words, the convex portion 25 of a part on the circumference is provided in the end surface at the atmospheric air side of the first flange portion 23 in the retaining ring 21, and the retaining ring 21 and the second lip seal member 31 are prevented from rotating on the basis of the engagement in the circumferential direction of the convex portion 25 with the second lip seal member 31. The engagement is performed by the convex portion 25 cutting into the surface of the second lip seal member 31 on the basis of caulking force at a time of the caulking work, however, a corresponding concave portion may be previously provided in the second lip seal member 31 so as to fit the convex portion 25.

Further, since the retaining ring 21 is constructed by the press worked product of the metal plate as mentioned above, a concave portion 26 of a part on the circumference corresponding to the convex portion 25 is formed in an end surface at the sealed fluid side of the first flange portion 23 by forming the convex portion 25 in accordance with the press work. Accordingly, the first lip seal member 11 made of the rubber-like elastic material is engaged in a circumferential direction with the concave portion 26, thereby preventing the retaining ring 21 and the first lip seal member 11 from rotating, so that the rotation preventing structure is provided also in this manner. The engagement is performed on the basis of a part of the rubber of the first lip seal member 11 cutting into the concave portion 26 by utilizing a pressure insertion margin of the retaining ring 21 with respect to the first lip seal member 11, however, a corresponding convex portion may be previously provided in the first lip seal member 11 so as to be fitted into the concave portion 26. A desired number of the convex portions 25 and the concave portions 26 are provided on the circumference, that is, they are provided at one position or a plurality of positions on the circumference.

Further, an annular projection 18 is provided on the end surface at the atmospheric air side of the radial portion 13 in the first lip seal member 11. A whole periphery of the annular projection 18 comes into close contact all around with the end surface at the sealed fluid side of the second lip seal member 31 at the inner peripheral side of the first flange portion 23 of the retaining ring 21, and seals between both the lip seal members 11 and 31. Accordingly, since the projection 18 mentioned above is provided, it is possible to improve a sealing performance between the first lip seal member 11, and the assembly constructed by the retaining ring 21 including the second lip seal member 31 and the backup ring 41. Further, while the rotation preventing structure is provided partly in the peripheral direction, an attitude of the second lip seal member 31 becomes stable in the structure in which the annular projection 18 is provided and the second lip seal member 31 is pushed uniformly in the peripheral direction by the first lip seal member 11, whereby it is possible to improve the sealing performance in this regard.

The lip type seal 1 of the structure mentioned above has the four parts including the first lip seal member 11 made of the rubber-like elastic material, the retaining ring 21 made of the metal, the second lip seal member 31 made of the resin, and the backup ring 41 made of the metal, as the constructing parts, the retaining ring 21 among them is fitted and retained in the non-bonding manner to the first lip seal member 11, and each of the second lip seal member 31 and the backup ring 41 is caulked and retained similarly in the non-bonding manner to the retaining ring 21. Accordingly, since the four parts are assembled in the non-bonding manner without being bonded to each other, it is possible to easily separate and sort each of the parts at a time of dissembling the seal. Therefore, it is possible to comply with the necessity for recycle that the constructing parts of the lip type seal 1 are disposed after being sorted by material.

Further, since each of the second lip seal member 31 and the backup ring 41 is retained by caulking to the retaining ring 21, these three parts can be firmly assembled with each other even if they are not bonded, so that they are not relatively displaced in the axial direction. Since the retaining ring 21 is fitted to the annular concave portion 17 between the radial portion 13 and the collar portion 15 in the inner peripheral side of the tubular portion 12 of the first lip seal member 11, the first flange portion 23 of the retaining ring 21 is arranged in such a manner as to come into contact with the radial portion 13 of the first lip seal member 11, and the second flange portion 24 of the retaining ring 21 is arranged in such a manner as to come into contact with the collar portion 15 of the first lip seal member 11, these two parts are firmly assembled with each other even if they are not bonded, so that they are not displaced relatively in the axial direction. Accordingly, since all of the four parts are firmly assembled in conjunction with each other, it is possible to increase the assembly retaining force among the parts. Therefore, it is possible to prevent the disadvantage that only some of the parts are pulled out at a time of detaching the lip type seal 1 from the housing 71 like as the prior art mentioned above from being caused.

Further, the four parts have been already integrated by caulking and fitting at a time when the lip type seal 1 is installed to the housing 71, and the assembly is finished in a ready-to-use state. Accordingly, it is possible to omit the regulating step or the like for maintaining the assembly length precision in the axial direction which has been necessary in the installing step of the conventional non-bonding type lip seal mentioned above.

Further, since the collar portion 15 is integrally formed on the end portion at the atmospheric air side of the tubular portion 12 in the first lip seal member 11, the end portion is substantially thickened, and is structured such as to be hardly deformed. Accordingly, it is possible to prevent the evagination phenomenon from being generated in the end portion at the atmospheric air side of the tubular portion 12 at a time when the lip type seal 1 is inserted to the inner periphery of the shaft hole 72 of the housing 71.

Further, since the retaining ring 21 is fitted and retained in the non-bonding manner to the first lip seal member 11, the lip type seal 1 does not have the structure in which the rubber-like elastic material (the first lip seal member 11) is vulcanized and bonded to the metal (the retaining ring 21). Accordingly, even if the lip type seal 1 is used under the high load condition, it is possible to prevent the foaming phenomenon which is peculiar to the bonding structure from being generated in the rubber-like elastic material.

Further, since there is provided the rotation preventing structure for preventing the retaining ring 21 and the second lip seal member 31 from rotating by the convex portion 25 provided in the first flange portion 23 of the retaining ring 21, it is possible to prevent both the parts from relatively rotating. Therefore, it is possible to prevent the second lip seal member 31 made of the resin from rotating together on the basis of the sliding motion with the shaft 73, and it is accordingly possible to stabilize the sealing performance.

Further, since there is provided the rotation preventing structure for preventing the retaining ring 21 and the first lip seal member 11 from rotating by the concave portion 26 provided in the first flange portion 23 of the retaining ring 21, it is possible to prevent the parts from relatively rotating. Accordingly, it is possible to prevent the assembly constructed by the resin made second lip seal member 31, the backup ring 41 and the retaining ring 21 from rotating together on the basis of the sliding motion with the shaft 73, and it is accordingly possible to stabilize the sealing performance.

Second Embodiment

Figure 2:
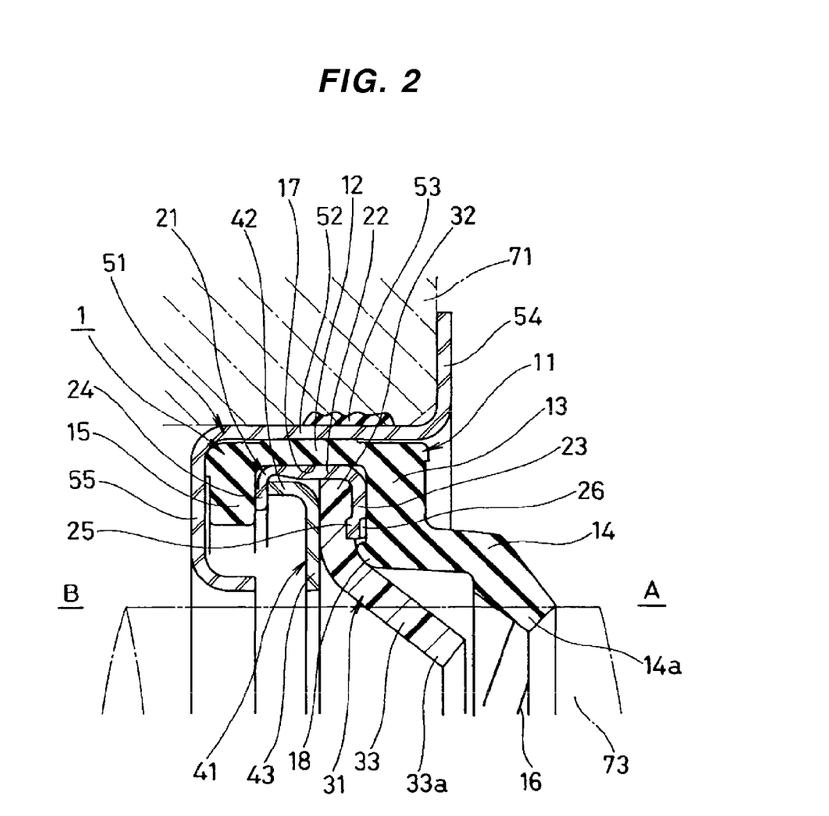
FIG. 2 is a sectional view of a substantial part of a lip type seal in accordance with a second embodiment of the present invention.

Meanwhile, the lip type seal 1 is directly fitted to the inner periphery of the shaft hole 72 of the housing 71 by the tubular portion 12 of the first lip seal member 11 in the first embodiment mentioned above, however, may be installed to the inner periphery of the shaft hole 72 of the housing 71 via a cartridge (a metal ring) 51 as shown in FIG. 2.

The cartridge 51 shown in FIG. 2 is constructed by a press worked product of a predetermined rigid material such as a metal or the like, for example, a metal plate, is formed in an annular shape as a whole, and is structured such that the lip type seal 1 having the structure mentioned above is fitted to an inner peripheral surface of a tube portion 52, and is fitted to the inner periphery of the shaft hole 72 of the housing 71 by an outer peripheral surface of the tube portion 52. An outer peripheral seal 53 which is made of an elastic membrane and is interposed between the cartridge 51 and the inner peripheral surface of the shaft hole 72 so as to perform a sealing action is attached all around to a whole periphery of an outer peripheral surface of the tube portion 52. An outward flange-shaped engagement portion 54 for regulating an insertion depth in an axial direction at a time of inserting the cartridge 51 to the shaft hole 72 is integrally formed on an end portion at the sealed fluid side of the tube portion 52. Further, an inward flange-shaped engagement portion 55 for regulating an insertion depth in the axial direction at a time of inserting the lip type seal 1 to the cartridge 51 is integrally formed on an end portion at the atmospheric air side of the tube portion 52.

Third Embodiment

Figure 3:
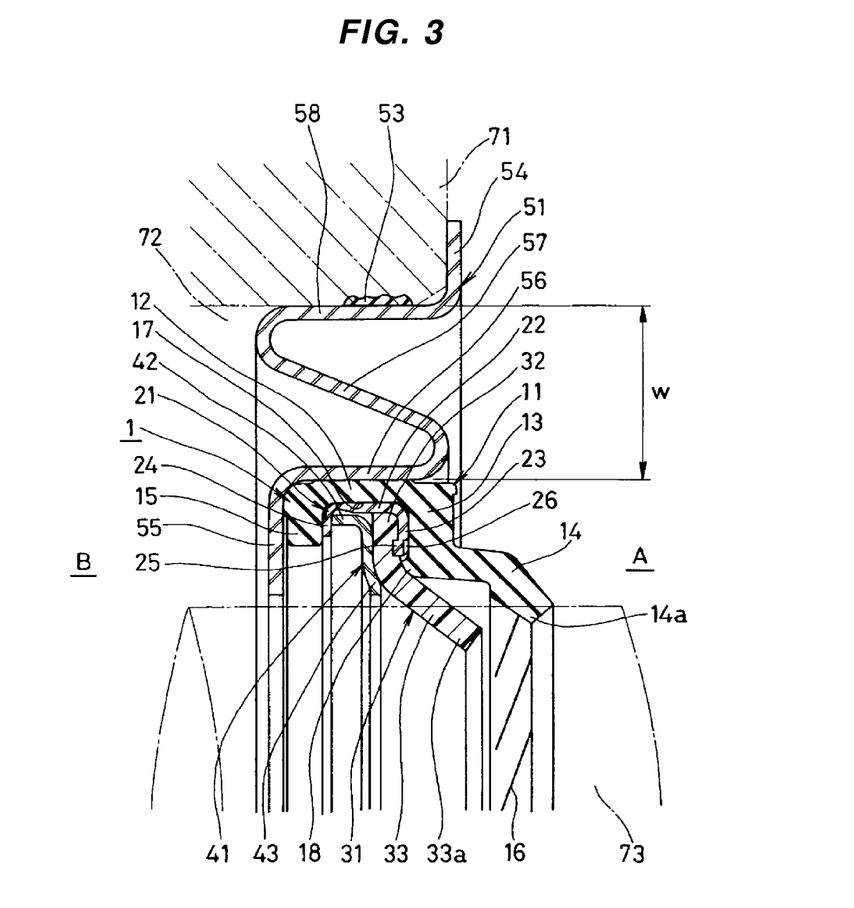
FIG. 3 is a sectional view of a substantial part of a lip type seal in accordance with a third embodiment of the present invention.

Further, the cartridge 51 may be structured such that the tube portion 52 is provided with a stepped shape formed as a plane perpendicular to the axis, or may be structured such that the tube portion 52 is provided with a stepped shape having an S-shape in section. In these cases, a magnitude (a diametrical dimension) of the cartridge 51 is varied in accordance with a width in a radial direction of the stepped shape. Accordingly, it is possible to install the lip type seal 1 to the shaft hole 72 having a various magnitude by selecting the cartridge 51 having a magnitude coinciding with a diameter of the shaft hole of an actual machine at a time of installing the lip type seal 1 to the actual machine. Therefore, it is possible to enhance a general purpose property of the lip type seal 1.

FIG. 3 shows one example of this type of cartridge 51, and is structured as follows.

In this example, the cartridge 51 is constructed by a press worked product of a predetermined rigid material such as a metal or the like, for example, a metal plate, is formed in an annular shape as a whole, has a small diameter tube portion 56, and is structured such that an annular step portion 57 is integrally formed on an end portion at the sealed fluid side of the small diameter tube portion 56 so as to be directed outward in a radial direction, a large diameter tube portion 58 is integrally formed on an outer peripheral end portion of the step portion 57 so as to be directed to the sealed fluid side A, and the lip type seal 1 is fitted to an inner peripheral surface of the small diameter tube portion 56 and is fitted to an inner peripheral surface of the shaft hole 72 by an outer peripheral surface of the large diameter tube portion 58 as illustrated. The outward flange-shaped engagement portion 54 is integrally formed on the end portion at the sealed fluid side of the large diameter tube portion 58. The inward flange-shaped engagement portion 55 is integrally formed on the end portion at the atmospheric air side of the small diameter tube portion 56. The step portion 57 is formed to have an S-shape or an approximately S-shape in section. As for the step portion 57 formed to have the S-shape in section and provided with an inclined surface portion, since the small diameter tube portion 56 and the large diameter tube portion 58 are arranged in so as to overlap partly in the axial direction, there is an advantage that the length in the axial direction can be made short. Further, in the case that the step portion 57 tends to be elastically deformed in the radial direction, it is possible to expect a follow characteristic with respect to an eccentricity of the shaft 73.

Further, in the case of using the cartridge 51 having the step portion 57 as mentioned above, since a width w in the radial direction of the step portion 57 is large, and the lip type seal 1 is arranged in an inner peripheral side thereof, the rotation preventing structure constructed by the convex portion 25 or the concave portion 26 provided in the lip type seal 1 is arranged a considerably inner side position in the radial direction within the shaft hole 72, and the inner side position in the radial direction corresponds to a position at which a torque for rotating the seal lip (the second lip seal member 31) is comparatively small. Accordingly, since the rotation preventing structure constructed by the convex portion 25 or the concave portion 26 is arranged at the position where the torque is small as mentioned above, a sufficient rotation preventing effect can be achieved, and there is created an advantage that it is unnecessary to add any other peculiar structure for further enhancing the rotation preventing effect.

What is claimed is:

1. A lip type seal installed to an inner periphery of a shaft hole of a housing to slidably come into close contact with a peripheral surface of a shaft, the lip type seal comprising:
a first lip seal member made of a rubber-like elastic material and fitted to the inner periphery of said shaft hole;
a retaining ring made of metal and fitted and retained to said first lip seal member in a non-bonding manner;
a second lip seal member made of a resin and retained by caulking to said retaining ring; and
a backup ring supporting the second lip seal member,
wherein said first lip seal member integrally has a tubular portion fitted to the inner periphery of said shaft hole, a radial portion provided on one end portion in an axial direction of said tubular portion, an annular projection provided on an end surface at an atmospheric air side of said radial portion, a seal lip provided on an inner peripheral end portion of said radial portion, and a collar portion provided on the other end portion in the axial direction of said tubular portion,
wherein said retaining ring integrally has a cylinder portion fitted in a non-bonding manner between the radial portion and the collar portion at an inner peripheral side of the tubular portion of said first lip seal member, a first flange portion provided on one end portion in an axial direction of said cylinder portion in such a manner as to come into contact with the end surface at the atmospheric side of said radial portion, and a second flange portion provided on the other end portion in the axial direction of said cylinder portion in such a manner as to come into contact with said collar portion, wherein said second lip seal member and the backup ring are retained by caulking between said first and second flange portions, wherein a convex portion of a part on a circumference is provided on the other end surface in the axial direction of the first flange portion, and the convex portion is penetrably engaged with the second lip seal member so that the retaining ring and the second lip seal member are prevented from rotating by the convex portion, wherein an entire surface at the atmospheric air side of the annular projection of the radial portion closely contacts an end surface at a sealed fluid side of the second lip seal member at an inner peripheral side of the first flange portion of the retaining ring, wherein a concave portion of a part on the circumference corresponding to said convex portion is provided in the one end surface in the axial direction of the first flange portion by said convex portion being formed in accordance with a press work, and the first lip seal member made of the rubber-like elastic material is penetrably engaged with said concave portion such that said retaining ring and the first lip seal member are prevented from rotating, wherein the annular projection projects axially away from the end surface at the atmospheric air side of said radial portion and into an area radially between an inner peripheral distal end surface of the first flange portion and the shaft so as to contact the end surface at the sealed fluid side of the second lip seal member, wherein the second lip seal member is retained by the annular projection, and the annular projection forms a seal between first lip seal member and the second lip seal member; and wherein a radial length of the collar portion is larger than that of the second flange portion, and radial length of the radial portion is larger than that of the first flange portion.

2. A lip type seal as claimed in claim 1, wherein said lip type seal is fitted to and retained in a cartridge, and is installed to a housing via said cartridge.

* * * * *